United States Patent [19]

Decaire et al.

[11] Patent Number: 5,275,751
[45] Date of Patent: Jan. 4, 1994

[54] AZEOTROPE-LIKE COMPOSITIONS OF TRIFLUOROMETHANE, CARBON DIOXIDE AND SULFUR HEXAFLUORIDE

[75] Inventors: Barbara R. Decaire, W. Amherst; Logsdon, Peter B., N. Tonawanda; Earl A. E. Lund, West Senech; Rajin R. Singh, Getzville; Ian R. Shankland, Williamsville, all of N.Y.

[73] Assignee: AlliedSignal Inc., Morristown, N.J.

[21] Appl. No.: 994,754

[22] Filed: Dec. 22, 1992

[51] Int. Cl.$^5$ .................................. C09K 5/04
[52] U.S. Cl. .......................... 252/67; 62/114; 252/DIG. 9
[58] Field of Search ............ 252/67, DIG. 9; 62/114

[56] References Cited

U.S. PATENT DOCUMENTS

| | | | |
|---|---|---|---|
| 2,101,993 | 12/1937 | Fleischer | 252/67 |
| 2,641,579 | 6/1953 | Benning | 252/67 |
| 3,719,603 | 3/1973 | Stahl | 252/67 |
| 4,263,253 | 4/1981 | Pilz et al. | 422/1 |
| 4,946,561 | 8/1990 | Braun et al. | 203/49 |
| 5,162,381 | 11/1992 | Richard et al. | 521/89 |

FOREIGN PATENT DOCUMENTS 4116274  11/1992  Fed. Rep. of Germany ........ 252/67

OTHER PUBLICATIONS

Abstract of JP 3,255,189-A, Nov. 14, 1991.
Chemical Abstract No. 108:119302p Abstract of Castonguay, J. *Gaseous Dielectr., Proc. Int. Symp. 5th* Pergamon, N.Y. pp. 526–535 1987.
Chemical Abstract No. 114:125105s abstract of Kruppa et al. *Sci Tech Froid* (1, Propr. Thermophys. Frigorigenes Purs Melange) pp. 69–75 1990.

*Primary Examiner*—Linda Skaling
*Attorney, Agent, or Firm*—Darryl L. Webster; Jay P. Friedenson

[57] ABSTRACT

Azeotrope-like compositions comprising trifluoromethane, carbon dioxide and sulfur hexafluoride are stable and have utility as refrigerants for heating and cooling.

3 Claims, No Drawings

AZEOTROPE-LIKE COMPOSITIONS OF TRIFLUOROMETHANE, CARBON DIOXIDE AND SULFUR HEXAFLUORIDE

BACKGROUND OF THE INVENTION

This invention relates to azeotrope-like or constant-boiling mixtures of trifluoromethane, carbon dioxide and sulfur hexafluoride. These mixtures are useful as refrigerants for heating and cooling.

Fluorocarbon based fluids have found widespread use in industry for refrigeration applications such as air conditioning and heat pump applications. Vapor compression is one form of refrigeration. In its simplest form, vapor compression involves changing the refrigerant from the liquid to the vapor phase through heat absorption at a low pressure and then from the vapor to the liquid phase through heat removal at an elevated pressure.

While the primary purpose of refrigeration is to remove energy at low temperature, the primary purpose of a heat pump is to add energy at higher temperature. Heat pumps are considered reverse cycle systems because for heating, the operation of the condenser is interchanged with that of the refrigeration evaporator.

Certain chlorofluoromethane and chlorofluoroethane derivatives have gained widespread use as refrigerants in applications including air conditioning and heat pump applications owing to their unique combination of chemical and physical properties. The majority of refrigerants utilized in vapor compression systems are either single components fluids or azeotropic mixtures.

Azeotropic or azeotrope-like compositions are desired as refrigerants because they do not fractionate upon boiling. This behavior is desirable because in the previously described vapor compression equipment with which these refrigerants are employed, condensed material is generated in preparation for cooling or for heating purposes. Unless the refrigerant composition exhibits a constant boiling point, i.e. is azeotrope-like, fractionation and segregation will occur upon evaporation and condensation and undesirable refrigerant distribution may act to upset the cooling or heating.

The art is continually seeking new fluorocarbon and hydrofluorocarbon based azeotrope-like mixtures which offer alternatives for refrigeration and heat pump applications. Fluorocarbon and hydrofluorocarbon based azeotrope-like mixtures are of particular interest because they are considered to be environmentally safe substitutes for the presently used fully halogenated chlorofluorocarbons (CFC's) which are suspected of causing environmental problems in connection with the earth's protective ozone layer.

Substitute refrigerants must also possess those properties unique to the CFC's refrigerants including similar refrigeration characteristics, chemical stability, low toxicity, non-flammability, and efficiency in-use. The latter characteristic is important in refrigeration and air-conditioning especially where a loss in refrigerant thermodynamic performance or energy efficiency may have secondary environmental impacts through increased fossil fuel usage arising from an increased demand for electrical energy. Furthermore, the ideal CFC refrigerant substitute would not require major engineering changes to conventional vapor compression technology currently used with CFC refrigerants. Mathematical models have substantiated that hydrofluorocarbons, such as trifluoromethane (HFC-23), will not adversely affect atmospheric chemistry, being a negligible contributor to ozone depletion and to green-house global warming in comparison to the fully halogenated species. HFC-23 alone is not useful as a refrigerant because of a reduction in low evaporator temperature capability.

R-503 is an azeotropic blend which consists of trifluoromethane (HFC-23) and chlorotrifluoromethane (CFC-13), a fully halogenated chlorofluorocarbon. (U.S. Pat. Nos. 2,101,993 and 2,641,579). Since R-503 contains the fully halogenated species CFC-13, the use of R-503 will eventually be phased out with the phase out of CFC-13. It is believed that the novel compositions of this invention may often be used as an alternative to R-503.

JP-3,255,189-A published Nov. 14, 1991 discloses a refrigerant composition of HFC-23 and n-pentane.

DETAILED DESCRIPTION OF THE INVENTION

We have discovered novel azeotrope-like or constant-boiling compositions comprising trifluoromethane (HFC-23), carbon dioxide ($CO_2$) and sulfur hexafluoride ($SF_6$).

The present azeotrope-like compositions consist essentially of about 5 to about 75 weight percent trifluoromethane, about 10 to about 45 weight percent carbon dioxide and about 15 to about 50 weight percent sulfur hexafluoride which have a vapor pressure of about 15 psia (103 kPa) at $-87°\pm1°$ C.

The present azeotrope-like compositions are advantageous for the following reasons. Each component is a negligible contributor to ozone depletion. Also, because the present compositions exhibit essentially constant-vapor pressure characteristics as the liquid mixture is evaporated and show relatively minor shifts in composition during evaporation, the compositions are advantageous in a vapor compression cycle as they mimic the performance of a constant-boiling single component or azeotropic mixture refrigerant.

The preferred azeotrope-like compositions are shown in the following Table I. In the Table, the numerical ranges are understood to be prefaced by "about":

TABLE I

| COMPONENTS | PREFERRED RANGE (WT. %) | MORE PREFERRED RANGE (WT. %) | MOST PREFERRED RANGE (WT. %) | VAPOR PRESSURE (PSIA) (kPa) AT $-87\pm1°$ C. |
|---|---|---|---|---|
| HFC-23 | 5-75 | 10-65 | 20-55 | 15 |
| Carbon Dioxide | 10-45 | 15-42 | 20-35 | |
| Sulfur Hexafluoride | 15-50 | 20-48 | 25-45 | |

Since HFC-23, $CO_2$ and $SF_6$ are individually non-flammable materials, their mixtures in all proportions are likewise non-flammable.

Additional components may be added to the mixture to tailor the properties of the mixture according to the need. For example, in the art, propane has been added to refrigerant compositions to aid oil solubility. Similar materials may be added to the present mixture.

All compositions within the indicated ranges, as well as certain compositions outside the indicated ranges, are azeotrope-like, as defined more particularly below.

The term "azeotrope-like composition" as used herein is intended to mean that the composition behaves like an azeotrope, i.e. has constant-boiling characteristics or a tendency not to fractionate upon boiling or evaporation. Thus, in such compositions, the composition of the vapor formed during boiling or evaporation is identical or substantially identical to the original liquid composition. Hence, during boiling or evaporation, the liquid composition, if it changes at all, changes only to a minimal or negligible extent. This is to be contrasted with non-azeotrope-like compositions in which during boiling or evaporation, the liquid composition changes to a substantial degree.

In one process embodiment of the invention, the azeotrope-like compositions of the invention may be used in a method for producing refrigeration which comprises condensing a refrigerant comprising the azeotrope-like compositions and thereafter evaporating the refrigerant in the vicinity of a body to be cooled.

In another process embodiment of the invention, the azeotrope compositions of the invention may be used in a method for producing heating which comprises condensing a refrigerant comprising the azeotrope-like compositions in the vicinity of a body to be heated and thereafter evaporating the refrigerant.

The trifluoromethane, carbon dioxide and sulfur hexafluoride of the novel azeotrope-like compositions of the invention are known materials and are commercially available. Preferably, the materials should be used in sufficiently high purity so as to avoid the introduction of adverse influences upon the cooling or heating properties or constant-boiling properties of the system.

EXAMPLE 1

This Example shows the azeotrope-like nature of a mixture of trifluoromethane, carbon dioxide and sulfur hexafluoride.

A 65:17:18 weight percent mixture of HFC-23, $CO_2$ and $SF_6$ was charged into a packed distillation column with about 150 theoretical separation stages. The overhead composition of the distillate remained at about 38.4 weight percent HFC-23, about 27 weight percent $CO_2$ and about 34.6 weight percent $SF_6$; i.e. these three components could not be separated. Further, the boiling point of the mixture was noted to be about $-87°$ C., which is lower than that of trifluoroethane ($-82°$ C.). Carbon dioxide and sulfur hexafluoride are solids at this temperature.

EXAMPLE 2

This Example shows that constant-boiling HFC-23/carbon dioxide/sulfur hexafluoride blends have certain advantages when compared to other refrigerants which are currently used in certain refrigeration cycles.

The theoretical performance of a refrigerant at specific operating conditions can be estimated from the thermodynamic properties of the refrigerant using standard refrigeration cycle analysis techniques; see for example, R. C. Downing, FLUOROCARBON REFRIGERANTS HANDBOOK, Chapter 3, Prentice-Hall, 1988. The coefficient of performance (COP) is a universally accepted measure, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the volumetric efficiency of the refrigerant. To a compressor engineer, this value expresses the capability of a compressor to pump quantities of heat for a given volumetric flow rate of refrigerant. In other words, given a specific compressor, a refrigerant with a higher capacity will deliver more cooling or heating power.

We have performed this type of calculation for a medium to low temperature refrigeration cycle where the condenser temperature is typically $-20°$ F. and the evaporator temperature is typically $-120°$ F. We have further assumed isentropic compression and a superheat of $20°$ F. ($18.3°$ C.). Such calculations were performed for various combinations of HFC-23/carbon dioxide/sulfur hexafluoride as well as for R-503. Table II lists the COP and capacity of the various blends relative to that of R-503. In Table II, "*" means that the COP and capacity are given relative to R-503.

TABLE II

THERMODYNAMIC PERFORMANCE

| Composition HFC-23/carbon dioxide/ sulfur hexafluoride (by weight) | COP* | Capacity* |
|---|---|---|
| 100% HFC-23 | 1.02 | 0.83 |
| 38.4%/27.0%/34.6% | 1.03 | 1.04 |
| 0% HFC-23 | $CO_2$ and $SF_6$ are solids at the operating conditions and cannot act as refrigerant(s). | |

As can be seen, the weight percent mixture (azeotrope) has improved refrigeration properties over both HFC-23, carbon dioxide and sulfur hexafluoride and is a good R-503 alternate.

What is claimed is:

1. Azeotrope-like compositions consisting essentially of about 20 to about 55 weight percent trifluoromethane, about 20 to about 35 weight percent carbon dioxide and about 25 to about 45 weight percent sulfur hexafluoride which have a vapor pressure of about 15 psia at $-87°\pm1°$ C.

2. A method for producing refrigeration which comprises condensing a refrigerant consisting essentially of the azeotrope-like compositions of claim 1 and thereafter evaporating said refrigerant in the vicinity of a body to be cooled.

3. A method for producing heating which comprises condensing a refrigerant consisting essentially of the azeotrope-like compositions of claim 1 in the vicinity of a body to be heated and thereafter evaporating said composition.

* * * * *